UNITED STATES PATENT OFFICE.

EMERSON H. STRICKLER, OF NEW YORK, N. Y.

PROCESS OF MAKING PHOSPHORIC ACID AND GLAUBER SALT.

No. 917,502.　　　Specification of Letters Patent.　　　Patented April 6, 1909.

Application filed December 28, 1903, Serial No. 186,892. Renewed May 3, 1906. Serial No. 314,952.

*To all whom it may concern:*

Be it known that I, EMERSON H. STRICKLER, citizen of the United States of America, residing at New York, in the county of New York and State of New York, have invented a certain new Method of Obtaining Phosphoric Acid and Glauber Salt, of which the following is a specification.

This invention has for its object to provide a new method of obtaining phosphoric acid and Glauber salt.

It has been proposed to obtain Glauber salt and sulfuric acid from bisulfate of soda by cooling a concentrated solution of the latter, thus causing Glauber salt to crystallize, and leaving sulfuric acid in solution as mother liquor.

I have discovered that Glauber salt can be crystallized from a solution of phosphoric acid much more readily than from sulfuric acid, the process being conducted in the following manner:—Calcium phosphate, or phosphate rock, is digested in a solution of bisulfate of soda, in the proportions indicated by the following reaction:

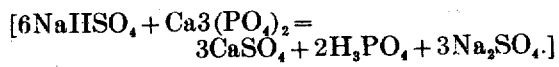

$$[6NaHSO_4 + Ca_3(PO_4)_2 = 3CaSO_4 + 2H_3PO_4 + 3Na_2SO_4.]$$

As a result of this procedure, phosphoric acid and sodium sulfate are obtained in solution, and calcium sulfate as an insoluble residue. The solution is separated from the residue by well known methods and concentrated by heat (to 30° B. or stronger.) Any insoluble matter which is precipitated during concentration, is allowed to settle out while the solution is yet warm. The solution is then run into cooling tanks, where on standing the sodium sulfate crystallizes out as Glauber salt. The phosphoric acid remains behind as mother liquor. The mother liquor can be again concentrated and the sodium sulfate contained in it further removed by a second crystallization. This mother liquor may be concentrated to any desired strength and utilized as crude phosphoric acid, for which article there are many technical uses. It is especially applicable for neutralization with a sulfid or carbonate of an alkali for making the corresponding alkali phosphate and for treatment of phosphate rock for making double superphosphate. The crystals obtained as above, after being taken from the crystallizing tanks, may be separated from the acid liquor clinging to them by a centrifugal machine or simply by draining.

To obtain a Glauber salt entirely free of acid, the crystals are dissolved in water and lime added to alkaline reaction. After the insoluble matter thus produced is settled or otherwise removed, the solution is allowed to crystallize and thus a very pure Glauber salt is obtained.

I claim as my invention:

1. The process of separating Glauber salt and phosphoric acid in the solution obtained by the digestion of phosphate rock in bisulfate of soda solution in combining proportions, by causing the Glauber salt to crystallize from the phosphoric acid by concentrating and cooling.

2. The process of separating Glauber salt and phosphoric acid in the solution obtained by the digestion of calcium phosphate in bisulfate of soda solution in combining proportions, by causing the Glauber salt to crystallize from the phosphoric acid by concentrating and cooling, and adding lime to a solution of the salt thus obtained to remove free acid, and again crystallizing.

3. The process of separating Glauber salt from a solution of phosphoric acid by crystallizing and digesting phosphate rock in solution of bisulfate of soda in the herein described proportions, then separating the resulting solution of phosphoric acid and sodium-sulfate from the residue and concentrating by heat, then allowing to settle while warm, and further cooling the same and allowing to stand, and again concentrating and crystallizing the mother-liquor.

In testimony whereof I affix my signature in presence of two witnesses.

EMERSON H. STRICKLER.

Witnesses:
A. B. STRICKLER,
ALF. N. RUSSELL.